(12) United States Patent
Iyer et al.

(10) Patent No.: US 9,946,660 B2
(45) Date of Patent: Apr. 17, 2018

(54) MEMORY SPACE MANAGEMENT

(71) Applicant: HEWLETT PACKARD ENTERPRISE DEVELOPMENT LP, Houston, TX (US)

(72) Inventors: Shankar Iyer, Cupertino, CA (US); Siamak Nazari, Mountain View, CA (US); Srinivasa D Murthy, Cupertino, CA (US); Jin Wang, Cupertino, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 97 days.

(21) Appl. No.: 15/223,754

(22) Filed: Jul. 29, 2016

(65) Prior Publication Data
US 2018/0032440 A1 Feb. 1, 2018

(51) Int. Cl.
*G06F 12/10* (2016.01)
*G06F 12/1009* (2016.01)
(Continued)

(52) U.S. Cl.
CPC ........ *G06F 12/1009* (2013.01); *G06F 12/023* (2013.01); *G06F 12/1027* (2013.01);
(Continued)

(58) Field of Classification Search
CPC ............... G06F 12/1009; G06F 12/023; G06F 12/1027; G06F 2212/1044; G06F 2212/65; G06F 2212/68
See application file for complete search history.

(56) References Cited

U.S. PATENT DOCUMENTS 5,699,539 A 12/1997 Garber et al.
7,840,877 B2 11/2010 Jacobson
(Continued)

FOREIGN PATENT DOCUMENTS

EP 0976045 B1 4/2002

OTHER PUBLICATIONS

Citrix, "Understanding Garbage Collection and Coalesce Process Troubleshooting," Jun. 2015, 5 pages, http://support.citrix.com/article/CTX201296 >.
(Continued)

*Primary Examiner* — Ryan Bertram
(74) *Attorney, Agent, or Firm* — Hewlett Packard Enterprise Patent Department

(57) ABSTRACT

Examples include a device for memory space management. Some examples include receiving, from a host, a space management request that identifies a virtual page address. The virtual page address may be associated with a compressed page that includes a compression metadata having a reference count that indicates a number of virtual pages of data in the compressed page. The virtual page table entry associated with the virtual page address in a virtual page table may be looked up. The virtual page table entry may identify the compressed page. In such examples, the virtual page table entry may be marked as invalid without updating the reference count in the compressed page. A determination may be made as to whether each virtual page table entry that identifies the compressed page is marked invalid. Based on the determination that each virtual page table entry that identifies the compressed page is invalid, a free space bitmap entry for the compressed page may be updated to indicate that the compressed page is free.

15 Claims, 8 Drawing Sheets

(51) Int. Cl.
*G06F 12/1027* (2016.01)
*G06F 12/02* (2006.01)
(52) U.S. Cl.
CPC .. *G06F 2212/1044* (2013.01); *G06F 2212/65* (2013.01); *G06F 2212/68* (2013.01)

(56) References Cited

U.S. PATENT DOCUMENTS

| | | | |
|---|---|---|---|
| 8,190,850 | B1 | 5/2012 | Davenport et al. |
| 8,538,936 | B2 | 9/2013 | Williams et al. |
| 8,615,500 | B1 | 12/2013 | Armangau et al. |
| 8,694,703 | B2 | 4/2014 | Hans et al. |
| 8,832,142 | B2 | 9/2014 | Marwah et al. |
| 8,838,890 | B2 | 9/2014 | Gupta et al. |
| 8,892,846 | B2 | 11/2014 | Pruthi et al. |
| 9,026,740 | B1 | 5/2015 | Shilane et al. |
| 2002/0178333 | A1 | 11/2002 | Wilson et al. |
| 2006/0005069 | A1 | 1/2006 | Gaertner |
| 2006/0212672 | A1 | 9/2006 | Chandrasekaran et al. |
| 2008/0307174 | A1 | 12/2008 | Garst et al. |
| 2011/0087840 | A1 | 4/2011 | Glasco et al. |
| 2011/0099321 | A1 | 4/2011 | Haines et al. |
| 2011/0307447 | A1 | 12/2011 | Sabaa et al. |
| 2012/0017027 | A1 | 1/2012 | Baskakov et al. |
| 2012/0084531 | A1* | 4/2012 | Funk ................ G06F 12/0223 711/171 |
| 2012/0102260 | A1* | 4/2012 | Kawamura ........... G06F 3/0608 711/103 |
| 2012/0216096 | A1* | 8/2012 | Seo ........................ H03M 7/30 714/763 |
| 2013/0185488 | A1 | 7/2013 | Talagala et al. |
| 2013/0282676 | A1 | 10/2013 | Wade et al. |
| 2014/0006745 | A1* | 1/2014 | Fontenot ................ G06F 12/04 711/170 |
| 2014/0229767 | A1* | 8/2014 | Kang .................. G06F 11/1435 714/22 |
| 2014/0372689 | A1 | 12/2014 | Colgrove et al. |
| 2014/0372715 | A1* | 12/2014 | Bak ..................... G06F 12/126 711/158 |
| 2016/0098356 | A1* | 4/2016 | Shiu ........................ G06F 3/061 711/133 |

OTHER PUBLICATIONS

Shankar Iyer, "Compressed Pages Having Data and Compression," Application Serial No. PCT/US2016/030082, filed Apr. 29, 2016, 53 pages.
Xingbo Wu, "Selfie: Co-locating Metadata and Data to Enable Fast Virtual Block Devices," May 26-28, 2015, 11 pages, http://www.ece.eng.wayne.edu/~sjiang/pubs/papers/wu15-selfie.pdf.
European Patent Office, "Extended European Search Report," dated Nov. 30, 2017, issued in European Patent Application No. 17175105.
Hayes, J., "Excerpts from video: Building Commercial Storage Systems from Consumer SSDs," Oct. 1, 2012, https://vimeo.com/50557873.
Hayes, J., "Building Commercial Storage Systems from Consumer SSDs," Oct. 1, 2012, (Presentation Slides), http://www.snia.org/sites/default/orig/SDC2012/presentations/Solid_State/JohnHayes_Enterprise_Storage_Systems.pdf.
International Search Report & Written Opinion received in PCT Application No. PCT/US2016/030082, dated Jan. 18, 2017, 12 pages.
Oracle Corporation, "Oracle Advanced Compression with Oracle Database 12c Release 2," (Research Paper), Oracle White Paper, Nov. 2016, 18 pages, available at http://www.oracle.com/technetwork/database/options/compression/advanced-compression-wp-12c-1896128.pdf.

* cited by examiner

MEMORY SPACE MANAGEMENT

BACKGROUND

Storage solutions may be tasked with quickly and efficiently storing and retrieving large amounts of data with a finite amount of processing power, bandwidth, and memory. Virtualization of memory, in which virtual memory addresses are mapped to physical memory addresses, may be used to improve memory efficiency. Memory utilization may be improved by managing memory allocation and freeing up unused memory space.

BRIEF DESCRIPTION OF THE DRAWINGS

The following detailed description references the drawings, wherein.

DETAILED DESCRIPTION

Figure 1:
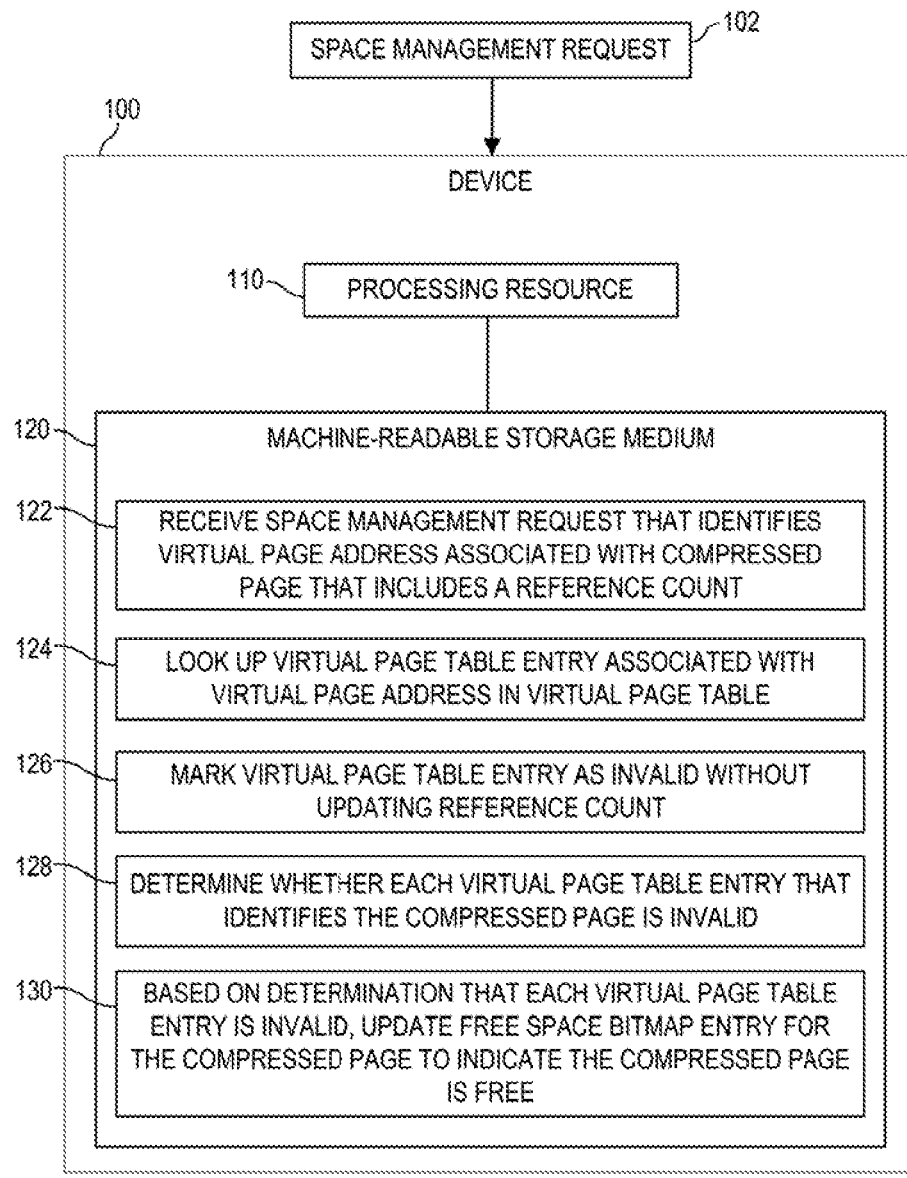
FIG. 1 is a block diagram of an example machine-readable storage medium including instructions to receive a space management request that identifies a virtual page address associated with a compressed page that includes a reference count and mark a virtual page table entry associated with a virtual page address as invalid without updating the reference count.

As storage demand expands, memory systems may be relied upon to quickly and efficiently store and retrieve large amounts of data using a finite amount of processing power, bandwidth, and memory. Virtual memory systems may employ memory management techniques that allow memory to appear as large, contiguous address spaces to processes or tasks. Those addresses (i.e., virtual memory addresses) may or may not correspond to contiguous physical memory addresses. Such techniques may involve memory that appears to be allocated when requested. In actuality, however, physical memory is allocated when necessary, for instance when data is actually written to storage media.

In some examples, the virtual memory system may compress data before it is written to memory to maximize memory utilization. Data compression may involve transmitting or storing data of a certain number of bits in a fewer number of bits via a compression algorithm. In some examples, data compression may involve encoding the data using fewer bits that the data's original representation. In other examples, data compression may involve reducing the size of the data by eliminating redundant or unnecessary bits. Such systems may involve storing several virtual pages of compressed data in a single memory page.

The use of such memory management techniques may involve overhead and/or data structures not present in memory systems that do not utilize such techniques. For instance, the virtual memory system may translate virtual memory addresses to corresponding physical memory addresses. In some examples, a page table populated by one or more page table entries may enable a virtual memory system to associate virtual memory addresses with physical memory addresses. Each page table entry may include suitable metadata, i.e., data that provides information about other data. For example, the metadata may include a virtual page number and a physical page number that can be used to generate a physical memory address. In addition, compression metadata may be generated to provide more information about the virtual pages stored within a compressed page. For example, compression metadata may be stored with the compressed data in the compressed page that indicates the number of virtual pages of data stored in the compressed page, the compression algorithm used, and the order or location of virtual pages within the compressed page. In such examples, compression metadata may be located with the data to facilitate the discovery and retrieval of data with relatively fewer memory accesses and page table or other metadata look-ups.

For efficient memory management and utilization, such virtual memory systems may also attempt to reclaim or free up unused memory space. In some virtual memory systems involving compression metadata stored together with the compressed data, requests to free up unused data may involve accessing, caching, and decompressing each compressed page to update the compression metadata and/or overwrite the compressed data itself. Doing so, however, may involve numerous large-scale write operations that may be computationally intensive, inefficient, and time-consuming. In other examples, compression metadata may be stored separately such that freeing unused memory space need not involve accessing the compressed page. But, as discussed above, separately locating compression metadata may result in inefficient memory operations involving a greater number of memory accesses and table look-ups.

Examples described herein may improve the fields of memory management and space allocation in computer and memory systems by freeing memory space without updating compression metadata stored with a compressed page and without accessing or caching compressed pages. For instance, some examples described herein may mark invalid a virtual page table entry that identifies a compressed page in response to a space management request. The compressed page may include compression metadata having a reference count that indicates a number of virtual pages of data within the compressed page. The virtual page table entry may be marked invalid without updating the reference count. Based (at least in part) on a determination that each virtual page table entry that identifies the compressed page is invalid, a free space bitmap entry for the compressed page may be updated to indicate the compressed page is free. In some examples described herein, compression metadata may be selectively updated in response to a memory access such that certain memory operations involve fewer memory accesses and table look-ups. In examples described herein, a determination, action, etc., that is said to be "based on" a given condition may be based on that condition alone or based on that condition and other condition(s).

In some examples described herein, a non-transitory machine-readable storage medium may comprise instructions executable by a processing resource of a device for memory space management to receive, from a host, a space management request that identifies a virtual page address, wherein the virtual page address is associated with a compressed page that includes a compression metadata having a reference count that indicates a number of virtual pages of data in the compressed page. The storage medium may further comprise instructions to look up a virtual page table entry associated with the virtual page address in a virtual page table and mark the virtual page table entry invalid without updating the reference count. The virtual page table entry may identify the compressed page. The storage medium may also comprise instructions to determine whether each virtual page table entry that identifies the compressed page is marked invalid. Based (at least in part) on the determination that each virtual page table entry that identifies the compressed page is invalid, a free space bitmap entry for the compressed page may be updated to indicate the compressed page is free.

In some such examples described herein, based (at least in part) on the determination that each virtual page table entry associated with the compressed page is not invalid, the free space bitmap entry for the compressed page may be left unaltered. In other such examples described herein, an acknowledgment message may be sent to the host after marking the virtual page table entry invalid. In some such examples, the instructions to determine whether each virtual page table entry that identifies the compressed page is marked invalid and the instructions to update the free space bitmap entry may further comprise instructions to execute as background tasks.

In some examples described herein, a device for memory space management may comprise a processing resource, a free space bitmap, a virtual page table entry, and a machine-readable storage medium encoded with instructions executable by the processing resource. The instructions may receive, from a host, a space management request that identifies a virtual page address. The virtual page address may be associated with a compressed page that includes a compression metadata having a reference count that indicates a number of virtual pages of data in the compressed page. The instructions may further look up a virtual page table entry associated with the virtual page address in the virtual page table and mark the virtual page table entry as invalid without updating the reference count. The virtual page table entry may identify the compressed page. The instructions may also determine whether each virtual page table entry that identifies the compressed page is marked invalid. Based (at least in part) on the determination that each virtual page table entry that identifies the compressed page is invalid, a free space bitmap entry for the compressed page in a free space bitmap may be updated to indicate the compressed page is free. Based (at least in part) on the determination that each virtual page table entry that identifies the compressed page is not invalid, the free space bitmap entry in the free space bitmap may be left unaltered.

In other examples described herein, a method of memory space management may involve determining, via a processing resource, whether a request to access a compressed page has been received, wherein a free space bitmap entry associated with the compressed page indicates the compressed page is in-use. The compressed page may include a compression metadata having a reference count that indicates a number of virtual pages of data in the compressed page. Based (at least in part) on the determination that the request to access has been received and based (at least in part) on the request to access, the reference count may be selectively decremented. The method further involves determining, via the processing resource, whether a space management request has been received, wherein the space management request identifies a virtual page address associated with the compressed page. Based (at least in part) on the determination that the space management request has been received, a virtual page table entry associated with the virtual page address in the virtual page table that identifies the compressed page may be looked up and marked as invalid without updating the reference count. The method may also involve determining, via the processing resource, whether each virtual page table entry that identifies the compressed page is marked invalid. Based (at least in part) on the determination that each virtual page table entry associated with the compressed page is invalid, a free space bitmap entry for the compressed page in the free space bitmap may be updated to indicate the compressed page is free. Based (at least in part) on the determination that each virtual page table entry associated with the compressed page is not invalid, the free space bitmap entry may be left unaltered.

Referring now to the drawings, FIG. 1 is a block diagram of an example machine-readable storage medium 120 that includes instructions to receive a space management request 102 from a host that identifies a virtual page address associated with a compressed page, the compressed page having a reference count that indicates a number of virtual pages of data in the compressed page. The instructions may be executable by a processing resource 110 of a device 100 for memory space management.

Device 100 includes a processing resource 110 and may be any networking or computing device suitable for execution of the functionality described below. As used herein, a device may be a desktop computer, laptop (or notebook) computer, workstation, tablet computer, mobile phone, smart device, switch, router, server, blade enclosure, or any other processing device or equipment including a processing resource.

As depicted in FIG. 1, device 100 may also include a machine-readable storage medium 120 comprising (e.g., encoded with) instructions 122, 124, 126, 128, and 130 executable by processing resource 110 to implement functionalities described herein in relation to FIG. 1. In some examples, storage medium 120 may include additional instructions. In other examples, the functionalities described herein in relation to instructions 122, 124, 126, 128, 130, and any additional instructions described herein in relation to storage medium 120, may be implemented at least in part in electronic circuitry (e.g., via components comprising any combination of hardware and programming to implement the functionalities described herein). In some examples, device 100 may be a controller node for a storage platform or may be located within a controller node for a storage platform. In some examples (not shown in FIG. 1), storage medium 120 may be located outside of device 100. In such examples, device 100 may communicate via a computer network (e.g., Internet, Local Area Network (LAN), Wide Area Network (WAN), etc.) with storage medium 120.

As used herein, a machine-readable storage medium may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory.

In examples described herein, a processing resource may include, for example, one processor or multiple processors included in a single device or distributed across multiple devices. As used herein, a processor may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processing resource 110 may fetch, decode, and execute instructions stored on storage medium 120 to perform the functionalities described above in relation to instructions 122, 124, 126, 128, and 130. In other examples, the functionalities of any of the instructions of storage medium 120 may be implemented in the form of electronic circuitry, in the form of executable instructions encoded on a machine-readable storage medium, or a combination thereof. In the example of FIG. 1, storage medium 120 may be implemented by one machine-readable storage medium, or multiple machine-readable storage media.

In the example of FIG. 1, instructions 122 may receive a space management request 102 from a host that identifies a virtual page address. A space management request, as described herein, may refer to a message or command to manage memory space by freeing unused memory. In some examples, space management request 102 may comprise an unmap request that unmaps a specific memory block (e.g., removes a pointer from a virtual page address to a physical page address to deallocate the physical page). In other examples, space management request 102 may comprise a write zero request or write same zero request to write all zeros to a specific memory block. Space management request 102 may be received from a host. A host, as described herein, may refer to a computer or other device running an operating system that allows a user access to the computer or device. In some examples, the host may be connected via a network to a storage platform or other memory system to store and retrieve data. In some such examples, the host may also be connected to other computers via a computer network (e.g., Internet, LAN, WAN, etc.). In other examples, a host may be a mainframe computer or server.

In the examples described herein, a virtual page address may refer to a virtual memory address for a page of memory. In some examples, the virtual address may be a virtual page number from which a virtual page address can be generated. In the examples described herein, a page may refer to a specific quantity of data. For example, a page may be a sequence of N bytes, where N is a power of 2. In examples involving virtual memory, a page may be 4 Kilobytes (KB) to 64 KB or more.

A virtual page address may be associated with a compressed page. In the examples herein, a compressed page refers to a page that includes compressed data and compression metadata. In some examples, the compressed data may include several virtual pages of data. In one example, a compressed page may include up to eight virtual pages. In other examples, the compressed page may include even more virtual pages depending on the size of the page, the amount of compression achieved, available memory space, and other such relevant variables. Compression metadata, as used herein, may refer to data within the compressed page that provides information about compressed data in the compressed page. In some examples, the compression metadata may include, among other things, a reference count, a compressed page offset, and a virtual page address. In some such examples, each of the reference count, the compressed page offset, and the virtual page address may represent separate fields made up of one or more bits that provide information about the compressed page and the compressed data within the compressed page.

In the examples described herein, the reference count may refer to the number of virtual pages within the compressed page. For instance, for a compressed page that includes two virtual pages, the reference count may include the value "2" or may otherwise indicate that the compressed page includes two virtual pages. Similarly, for a compressed page that includes 8 virtual pages, the reference count may include the value "8" or may otherwise indicate that the compressed page includes eight virtual pages. In some examples, the compressed page offset may refer to an offset that specifies where the data associated with each virtual page in a compressed page is located within that compressed page.

Based (at least in part) on the virtual page address identified in space management request 102, instructions 124 may look up a virtual page table entry associated with the virtual page address in a virtual page table. As used in the examples herein, a virtual page table may refer to a table or other suitable data structure that includes one or more virtual page table entries. In some examples, a virtual page table may comprise several levels. For example, a multi-level virtual page table may include a first level virtual page table and a second level virtual page table, each of which are indexed or searched using different bits or portions of a search term such as a virtual page address or a previous level virtual page table. In other examples, a multi-level virtual page table may include more levels, as appropriate.

A virtual page table entry, as used in the examples herein, may refer to a row, a line, or other suitable portion of a virtual page table that aids in associating a virtual memory address with a physical memory address. The data or information within the virtual page table entry may be referred to as metadata and may be stored in fields within the virtual page table entry. As used herein, metadata may refer to data that provides information about other data. The virtual page table may be searched and the virtual page table entry looked up via the virtual page address. The virtual page address may allow for efficient look-up or search of a virtual page's corresponding virtual page table entry. In some examples, each virtual page table entry may represent a virtual page of data.

Figure 8:
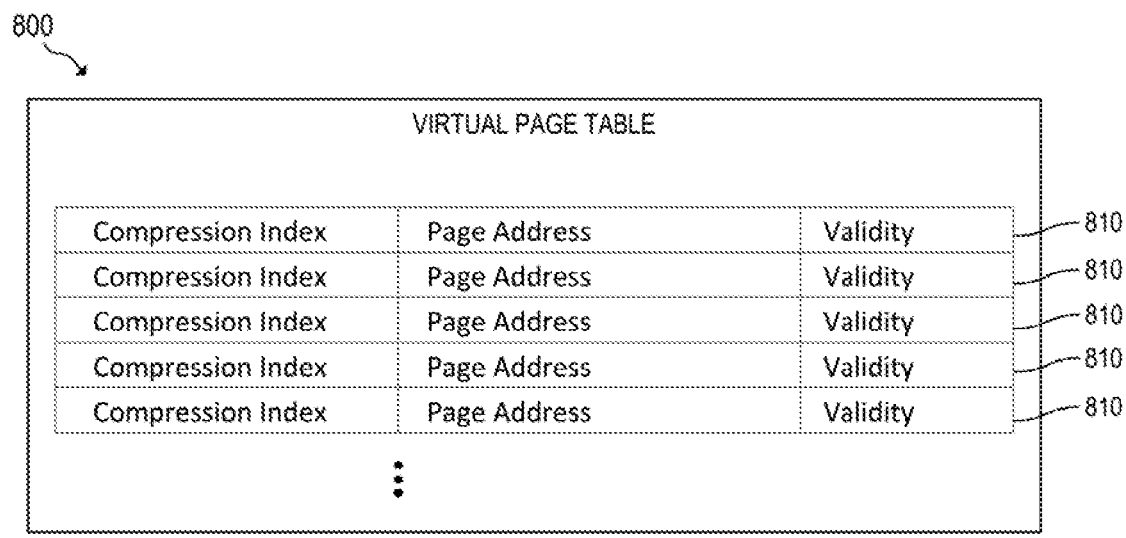
FIG. 8 is a block diagram of an example virtual page table having virtual page table entries with a compression index, a page address, and a validity field.

FIG. 8 depicts an example virtual page table 800 that includes several virtual page table entries 810. As depicted, each virtual page table entry includes a compression index field, a page address field, and a validity field. The compression index field may refer to a particular virtual page that contains data within a compressed page. For example, a compression index of "0" may indicate that the data associated with the virtual page is located as the first virtual page within the compressed page. Similarly, a compression index of "1" may indicate that the data is located as the second virtual page within the compressed page. In such an example, the first virtual page may be occupied by other data. The page address field may refer to the physical page at which the virtual page of data is located, i.e., the address of the compressed page. In some examples, virtual page table 800 may include additional metadata not shown in FIG. 8. For example, virtual page table 800 may include a second valid bit to indicate whether the page is in primary memory. An indication that the page is not in primary memory may correspond to a page fault and may involve an additional memory access to determine a page address for the physical page.

Returning to FIG. 1, instructions 126 may mark the virtual page table entry as invalid. In some examples, marking the virtual page table entry as invalid may involve setting or resetting a validity field in the virtual page table entry. In other examples, marking the virtual page table entry as invalid may involve deleting or zeroing the contents of the virtual page table entry. Instructions 126 may mark the virtual page table entry as invalid without updating or altering the reference count within the compression metadata of the compressed page. In such examples, the reference count of the compressed page may be inaccurate. Marking the virtual page table entry as invalid without updating the reference count, however, enables the freeing of unused memory space without resource-intensive memory accesses involving the decompression of compressed data.

In the example of FIG. 1, instructions 128 may determine whether each virtual page table entry that identifies the compressed page is marked invalid. In some examples, a page address of the compressed page may be identified from looking up the virtual page table entry associated with the virtual page address. Based (at least in part) on the page address of the compressed page, instructions 128 may search the virtual page table for any other virtual page table entries that identify the compressed page and determine a state of the virtual page table entry. In some examples, each virtual page table entry may comprise a validity field that indicates whether the virtual page table entry is valid or invalid.

Based (at least in part) on the determination that each virtual page table entry that identifies the compressed page is marked invalid, instructions 130 may update a free space bitmap entry for the compressed page in the free space bitmap to indicate that the compressed page is free. As used in the examples herein, a free space bitmap may refer to a table or other suitable data structure that includes one or more free space bitmap entries. A free space bitmap entry, as used herein, may refer to a row, a line, or other suitable portion of a free space bitmap table that indicates whether a compressed page is free or not free. Each free space bitmap entry may be associated with a compressed page. The free space bitmap may be searched and the free space bitmap entry looked up via the compressed page. In some such examples, the page address may allow for efficient look-up or search of a compressed page's corresponding free space bitmap entry.

In some examples, a free space bitmap entry may comprise a single bit that indicates whether the compressed page is free. For instance, a "1" may indicate the compressed page is in-use whereas a "0" may indicate the compressed page is free. In such examples, the free space bitmap entry may be updated to "0" based (at least in part) on the determination that each virtual page table entry that identifies the compressed page is invalid. In other examples, the free space bitmap may comprise separate fields made up of one or more bits that provide information about the compressed page, including whether the compressed page is in-use or free. Based (at least in part) on the determination that each virtual page table entry that identifies the compressed page is marked invalid, the field may be updated to indicate the compressed page is free.

In some examples, instructions 122, 124, 126, 128, and 130 may be part of an installation package that, when installed, may be executed by processing resource 110 to implement the functionalities described above. In such examples, storage medium 120 may be a portable medium, such as a CD, DVD, or flash drive, or a memory maintained by a server from which the installation package can be downloaded and installed. In other examples, instructions 122, 124, 126, 128, and 130 may be part of an application, applications, or component(s) already installed on device 100 including processing resource 110. In such examples, the storage medium 120 may include memory such as a hard drive, solid state drive, or the like. In some examples, functionalities described herein in relation to FIG. 1 may be provided in combination with functionalities described herein in relation to any of FIGS. 2-8.

Figure 2:
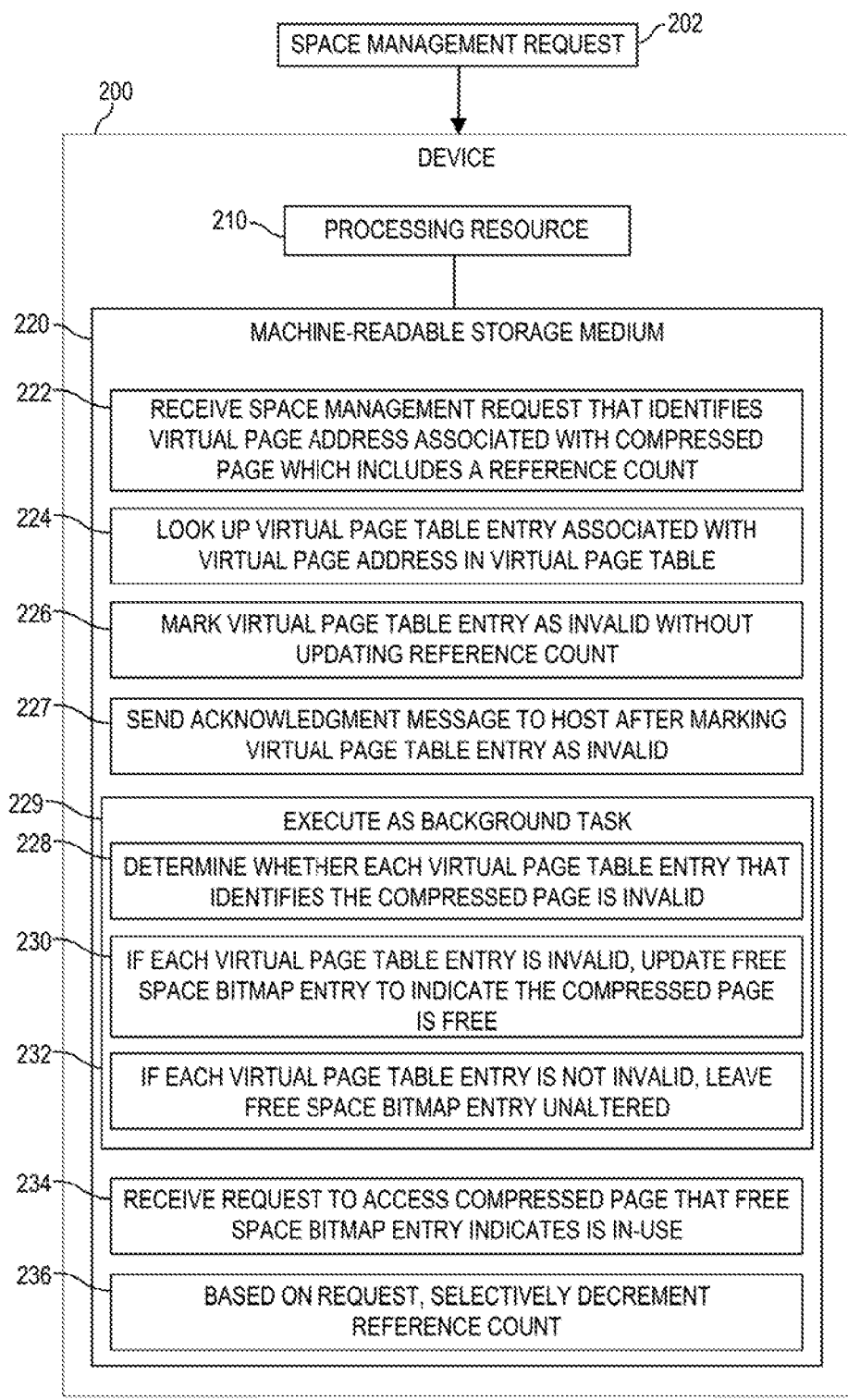
FIG. 2 is a block diagram of an example machine-readable storage medium including instructions to, as a background task, determine whether each virtual page table entry that identifies the compressed page is marked invalid and if so, update a free space bitmap entry to indicate the compressed page is free.

Further examples are described herein in relation to FIG. 2, which is a block diagram of an example machine-readable storage medium 220 that includes instructions to receive a space management request that identifies a virtual page address and, among other things, leave a free space bitmap entry for a compressed page unaltered based (at least in part) on a determination that each virtual page table entry associated with the compressed page is not invalid. The example of FIG. 2 includes device 200 for memory space management, processing resource 210, and machine-readable storage medium 220 comprising instructions 222, 224, 226, 228, and 230, as described above in relation to instructions 122, 124, 126, 128, and 130 of FIG. 1. The example of FIG. 2 further includes the machine-readable storage medium 220 comprising instructions 227, 229, 232, 234, and 236 executable by processing resource 210 to implement functionalities described herein in relation to FIG. 2.

In some examples, storage medium 220 may include additional instructions. In other examples, the functionalities described herein in relation to instructions 222, 224, 226, 227, 228, 229, 230, 232, 234, and 236, and any additional instructions described herein in relation to storage medium 220, may be implemented at least in part in electronic circuitry (e.g., via components comprising any combination of hardware and programming to implement the functionalities described herein). In some examples, device 200 may be a controller node for a storage platform or may be located within a controller node for a storage platform. In some examples (not shown in FIG. 1B), storage medium 220 may be located outside of device 200. In such examples, device 200 may communicate via a computer network (e.g., Internet, LAN, WAN, etc.) with storage medium 220.

Processing resource 210 may fetch, decode, and execute instructions stored on storage medium 220 to perform the functionalities described above in relation to instructions 222, 224, 226, 228, 230, 232, 234, 236, and 238. In other examples, the functionalities of any of the instructions of storage medium 220 may be implemented in the form of electronic circuitry, in the form of executable instructions encoded on a machine-readable storage medium, or a combination thereof. In the example of FIG. 2, storage medium 220 may be implemented by one machine-readable storage medium, or multiple machine-readable storage media.

As described above, in relation to instructions 122 of FIG. 1, instructions 222 may receive a space management request 202 that identifies a virtual page address associated with a compressed page. The compressed page may include compression metadata having a reference count that indicates a number of virtual pages of data in the compressed page. Instructions 224, as described above in relation to instructions 124 of FIG. 1, may look up a virtual page table entry associated with the virtual page address in a virtual page table. Instructions 226, as described above in relation to instructions 126 of FIG. 1, may mark the virtual page table entry as invalid without updating the reference count.

As depicted in FIG. 2, instructions 227 may send an acknowledgment message to the host after marking the virtual page table entry as invalid. In some examples, the acknowledgment message may indicate the completion of the space management request. In other examples, the sending of the acknowledgment message to the host may trigger certain instructions to be executed in the background as background tasks.

Figure 3:
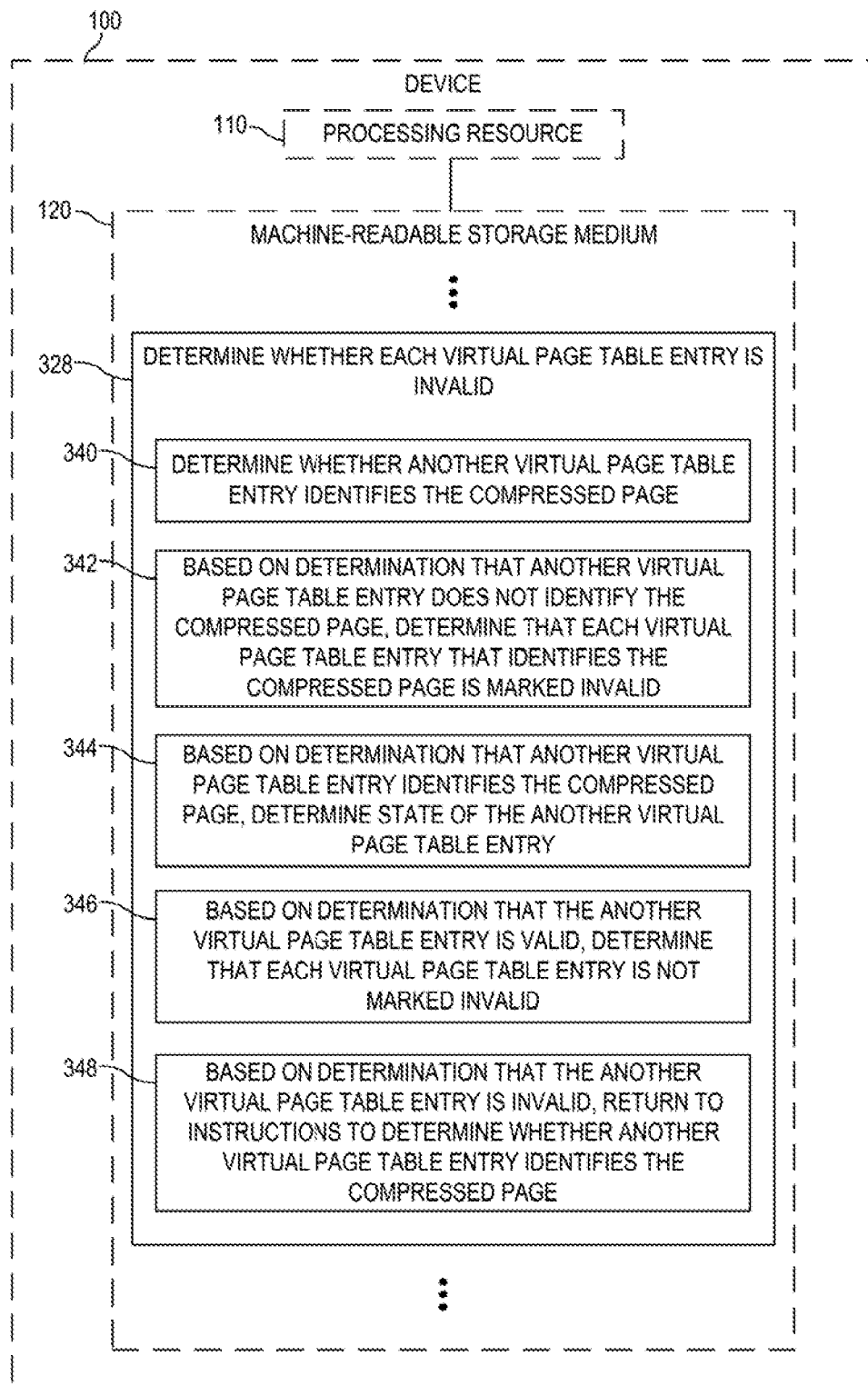
FIG. 3 is a block diagram of instructions to determine whether each virtual page table entry is invalid.

As described above in relation to instructions 128 of FIG. 1, Instructions 228 may determine whether each virtual page table entry that identifies the compressed page is marked invalid. In some examples, instructions 228 of FIG. 2 may further comprise instructions such as those depicted in the example of FIG. 3. As shown in FIG. 3, instructions 328 may determine whether each virtual page table entry that identifies the compressed page is marked invalid via instructions 340, 342, 344, 346, and 348. Instructions 340 may determine whether another virtual page table entry identifies the compressed page. In some examples, instructions 340 may look up or search a virtual page table for another virtual page table entry that identifies the compressed page. In such examples, instructions 340 may search the virtual page table using the page address of the compressed page. In other examples, instructions 340 may search the virtual page table using another identifier of the compressed page.

Based (at least in part) on the determination that another virtual page table entry does not identify the compressed page, instructions 342 determine that each virtual page table entry that identifies the compressed page is marked invalid. Instructions 342 may trigger the updating of the free space bitmap entry for the compressed page such that the free space bitmap entry indicates that the compressed page is free. Based (at least in part) on the determination that another virtual page table entry does identify the compressed page, instructions 344 may determine the state of the other virtual page table entry. As used herein, "the other" may be used to refer to "the another". As discussed above in relation to FIG. 8, each virtual page table entry may include a validity field that indicates whether the virtual page table entry is valid (and in-use) or not valid (and free). In some examples, instructions 344 may evaluate the validity field of the other virtual page table entry to determine its state.

Based (at least in part) on the determination that the other virtual page table entry is valid, instructions 346 determine that each virtual page table entry that identifies the compressed page is not marked invalid. In response to instructions 346, the free space entry for the compressed page may be left unaltered such that it indicates that the compressed page is in-use. Based (at least in part) on the determination that the other virtual page table entry is invalid, instructions 348 may return to instructions 340 to determine whether another virtual page table entry identifies the compressed page. In some examples, the instructions of FIG. 3 may iterate until it is determined that no additional virtual page table entries identify the compressed page or until it is determined that a virtual page table entry that identifies the compressed page is marked valid.

Returning to FIG. 2, based (at least in part) on the determination that each virtual page table entry is invalid, instructions 230, like instructions 130 of FIG. 1, update a free space bitmap entry for the compressed page to indicate the compressed page is free. In some examples, based (at least in part) on the determination that each virtual page table entry associated with the compressed page is not invalid, instructions 232 of FIG. 2 may leave the free space bitmap entry for the compressed page unaltered. Accordingly, the free space bitmap entry will indicate that the compressed page is in-use.

In some examples, instructions 228, 230, and 232 may further comprise instructions 229 to execute as background tasks. As used in the examples herein, a background task may refer to a task that runs or executes in the background without user intervention. In some examples, a background task is executed periodically. In other examples, a background task executes when CPU or controller usage permits based (at least in part) on any number of variables, including CPU or controller utilization, queued tasks, priority of queued tasks, and the like. In yet other examples, background tasks may run continually in the background.

As depicted in FIG. 2, instructions 234 may receive a request to access the compressed page, wherein the free space bitmap entry for the compressed page indicates that it is in-use. In some examples, the request to access the compressed page may comprise a write operation, a read operation, a read-modify-write operation, or the like. Instructions 234 may receive the request to access the compressed page from a user, a process or task as part of a larger transaction or operation, another controller node, and the like.

Based (at least in part) on the request to access the compressed page, instructions 236 may selectively decrement the reference count stored in the compression metadata of the compressed page. In one example, instructions 232 may receive a read-modify-write request to modify the data stored in a virtual page of the compressed page and re-write modified data. If a page-fit process determines that the modified data will fit in the original compressed page, the modified data may be written and the reference count may remain unchanged. If, however, a page-fit process determines that the modified data will not fit in the original compressed page, the modified data may be written elsewhere and the reference count of the compressed page may be decremented to indicate that the compressed page stores one less virtual page of data. In another example, instructions 232 may receive a read request to read data stored in a compressed page. In such examples, the reference count of the compressed page may remain unaltered. Storing compression metadata with the compressed page and selectively updating the compression metadata when the compressed page is accessed may allow for fewer memory accesses and table look-ups minimizing resource utilization and increasing memory efficiency.

In some examples, instructions 222, 224, 226, 227, 228, 229, 230, 232, 234, and 236 may be part of an installation package that, when installed, may be executed by processing resource 210 to implement the functionalities described above. In other examples, the installation package may further include instructions 340, 342, 344, 346, and 348 that, when installed, may be executed by processing resource 210 to implement the functionalities described above. In such examples, storage medium 220 may be a portable medium, such as a CD, DVD, or flash drive, or a memory maintained by a server from which the installation package can be downloaded and installed. In other examples, instructions 222, 224, 226, 227, 228, 229, 230, 232, 234, 236 and/or instructions 340, 342, 344, 346, and 348 may be part of an application, applications, or component(s) already installed on device 200 including processing resource 210. In such examples, the storage medium 220 may include memory such as a hard drive, solid state drive, or the like. In some examples, functionalities described herein in relation to FIGS. 2 and 3 may be provided in combination with functionalities described herein in relation to any of FIGS. 1 and 4-8.

Figure 4:
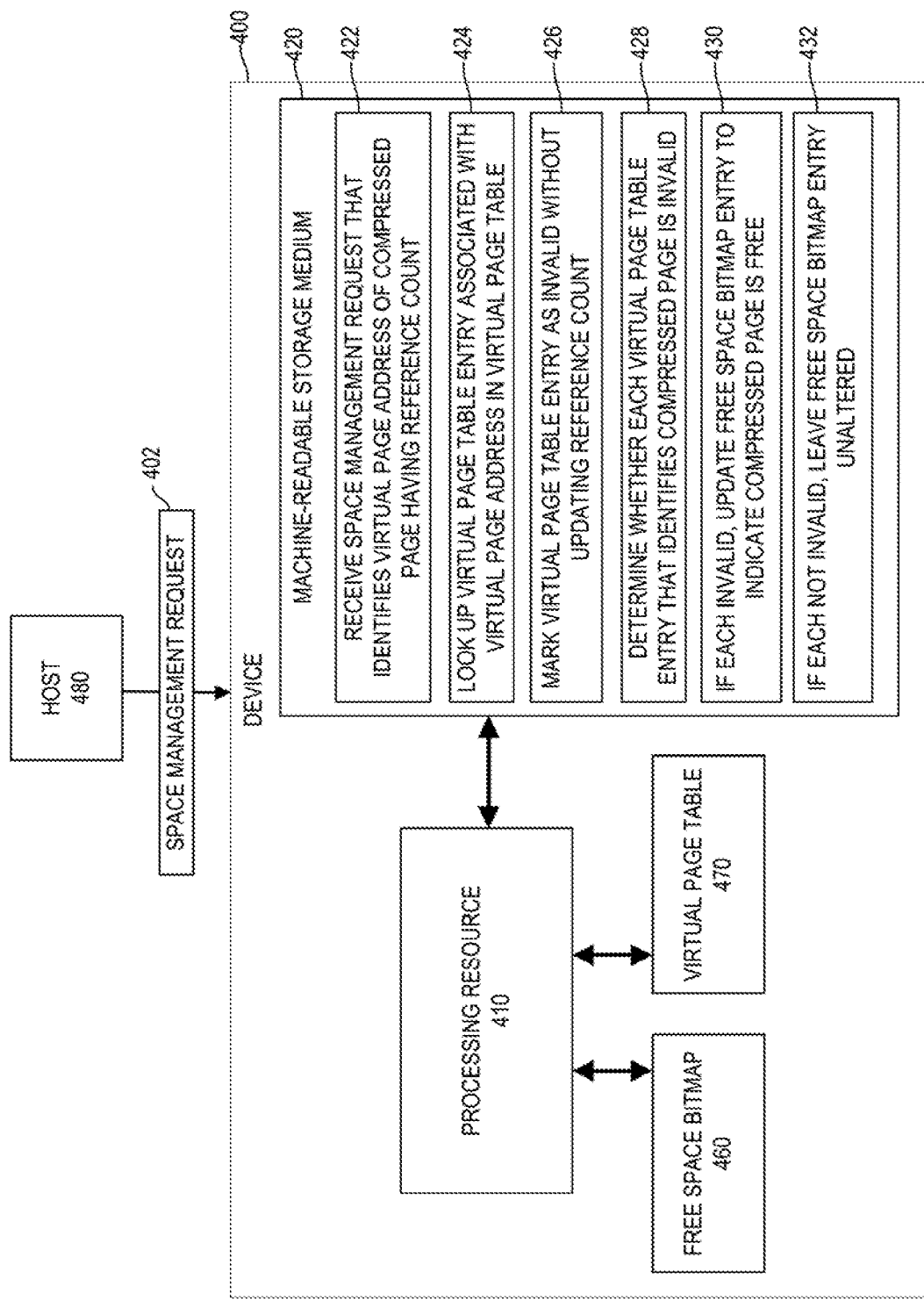
FIG. 4 is a block diagram of an example device having a free space bitmap, a virtual page table, and a machine-readable storage medium comprising instructions to determine whether each virtual page table entry that identifies a compressed page is invalid and if so, update a free space bitmap entry to indicate the compressed page is free and if not, leave the free space bitmap entry unaltered.

FIG. 4 is a block diagram of an example device 400 for memory space management having a free space bitmap 460 and a virtual page table 470. As described above in relation to FIGS. 1 and 2, free space bitmap 460 may refer to a table or other suitable data structure that includes one or more free space bitmap entries. Each free space bitmap entry indicates whether a compressed page is free or not free. Virtual page table 470, as described above in relation to FIGS. 1, 2 and 8, may refer to a table or other suitable data structure that includes one or more virtual page table entries. The virtual page table entries may aid in associating a virtual memory address with a physical memory address. In some examples, virtual page table 470 may organized similar to virtual page table 800 of FIG. 8.

Device 400 also includes a processing resource 410 and may be any networking or computing device suitable for execution of the functionality described below. As depicted in FIG. 4, device 400 may also include a machine-readable storage medium 420 comprising (e.g., encoded with) instructions 422, 424, 426, 428, 430, and 432 executable by processing resource 410 to implement functionalities described herein in relation to FIG. 4. In some examples, storage medium 420 may include additional instructions. In other examples, the functionalities described herein in relation to instructions 422, 424, 426, 428, 430, 432, and any additional instructions described herein in relation to storage medium 420, may be implemented at least in part in electronic circuitry (e.g., via components comprising any combination of hardware and programming to implement the functionalities described herein). In some examples, device 400 may be a controller node for a storage platform or may be located within a controller node for a storage platform.

Processing resource 410 may fetch, decode, and execute instructions stored on storage medium 420 to perform the functionalities described above in relation to instructions 422, 424, 426, 428, 430, and 432. In other examples, the functionalities of any of the instructions of storage medium 420 may be implemented in the form of electronic circuitry, in the form of executable instructions encoded on a machine-readable storage medium, or a combination thereof. In the example of FIG. 4, storage medium 420 may be implemented by one machine-readable storage medium, or multiple machine-readable storage media.

Instructions 422 may receive a space management request 402 from a host 480 that identifies a virtual page address associated with a compressed page, as described above in relation to instructions 122 in FIG. 1. The compressed page may include compression metadata having a reference count that indicates a number of virtual pages of data in the compressed page. Host 480 may be a computer or other device running an operating system that allows a user access to the computer or device.

Instructions 424 may look up a virtual page table entry associated with the virtual page address in virtual page table 470, as described above in relation to instructions 124 of FIG. 1. The virtual page table entry of virtual page table 470 may identify the compressed page. Instructions 426 may mark the virtual page table entry as invalid without updating the reference count, as described above in relation to instructions 126 in FIG. 1. Instructions 428 may determine whether each virtual page table entry that identifies the compressed page is marked invalid, as described above in relation to instructions 128 of FIG. 1. In some examples, instructions 428 may further comprise instructions 340, 342, 344, 346, and 348 of FIG. 3.

Based (at least in part) on the determination that each virtual page table entry that identifies the compressed page is marked invalid, instructions 430 may update the free space bitmap entry for the compressed page in the free space bitmap 460 to indicate the compressed page is free, as described above in relation to instructions 130 of FIG. 1. In some examples, updating the free space bitmap entry may involve setting or resetting the bit. For instance, setting the free space bitmap entry to "1" may indicate the compressed page is in-use whereas resetting the free space bitmap entry to "0" may indicate the compressed page is free. Based (at least in part) on the determination that each virtual page table entry associated with the compressed page is not invalid, instructions 432 may leave the free space bitmap entry for the compressed page unaltered, as described above in relation to instructions 232 of FIG. 2. Accordingly the free space bitmap entry will indicate that the compressed page is in-use.

In some examples, instructions 422, 424, 426, 428, 430, and 432 may be part of an installation package that, when installed, may be executed by processing resource 410 of device 400 to implement the functionalities described above. In such examples, storage medium 420 may be a portable medium, such as a CD, DVD, or flash drive, or a memory maintained by a server from which the installation package can be downloaded and installed. In other examples, instructions 422, 424, 426, 428, 430, and 432 may be part of an application, applications, or component(s) already installed on device 400 including processing resource 410. In such examples, the storage medium 420 may include memory such as a hard drive, solid state drive, or the like. In some examples, functionalities described herein in relation to FIG. 4 may be provided in combination with functionalities described herein in relation to any of FIGS. 1-3 and 4-8.

Figure 5:
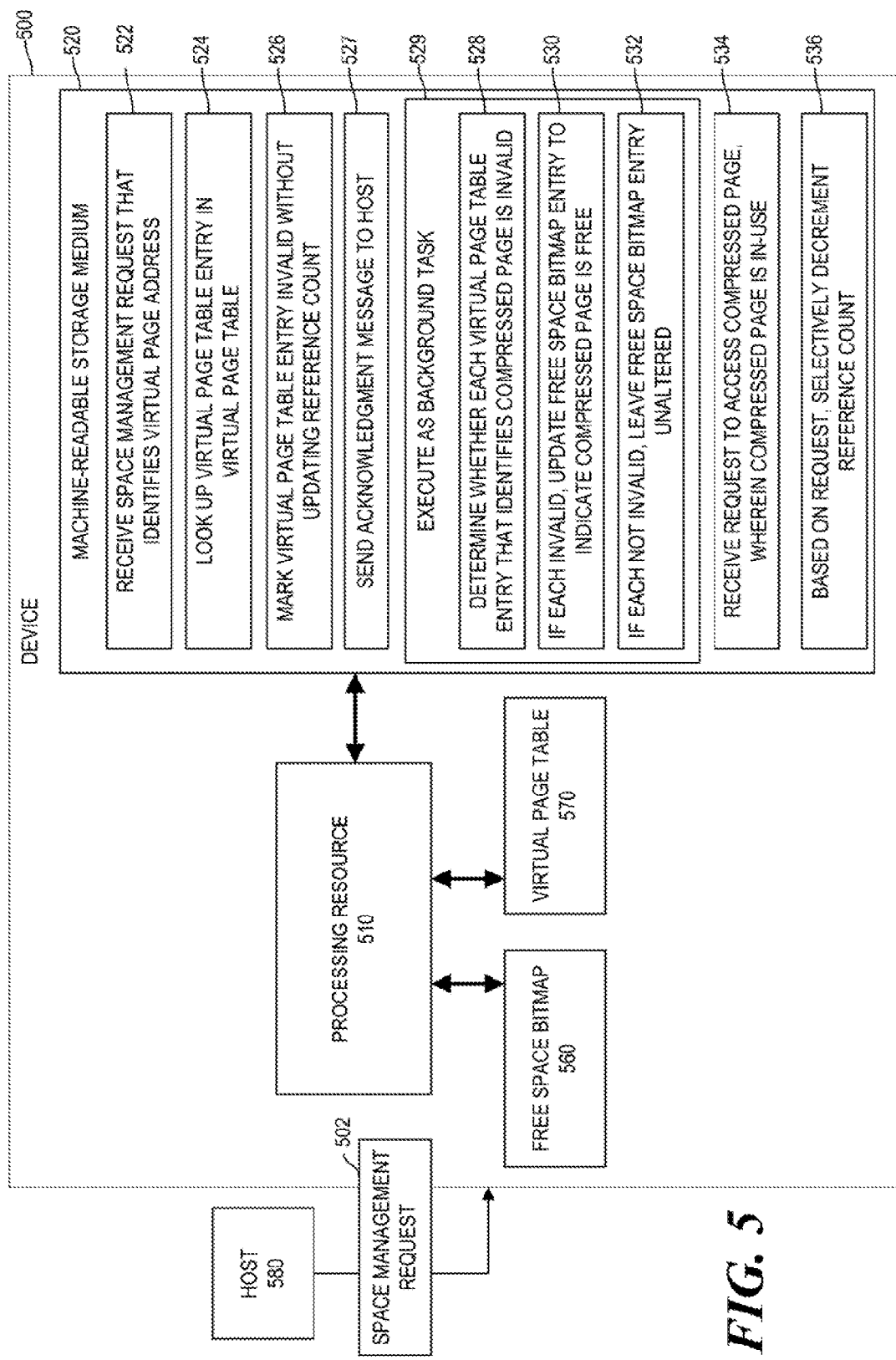
FIG. 5 is a block diagram of an example device having a free space bitmap, a virtual page table, and a machine-readable storage medium comprising instructions to send an acknowledgment to a host after marking a virtual page table entry invalid without updating a reference count.

Further examples are described herein in relation to FIG. 5. FIG. 5 is a block diagram of an example device 500 for memory space management having a free space bitmap 560 and a virtual page table 570. As described above in relation to FIGS. 1 and 2, free space bitmap 560 may refer to a table or other suitable data structure that includes one or more free space bitmap entries. Each free space bitmap entry indicates whether a compressed page is free or not free. Virtual page table 570, as described above in relation to FIGS. 1, 2 and 8, may refer to a table or other suitable data structure that includes one or more virtual page table entries. The virtual page table entries may aid in associating a virtual memory address with a physical memory address. In some examples, virtual page table 570 may organized similar to virtual page table 800 of FIG. 8.

Device 500 also includes a processing resource 510 and may be any networking or computing device suitable for execution of the functionality described below. As depicted in FIG. 5, device 500 may also include a machine-readable storage medium 520 comprising (e.g., encoded with) instructions 522, 524, 526, 527, 528, 529, 530, 532, 534, and 536 executable by processing resource 510 to implement functionalities described herein in relation to FIG. 5. In some examples, storage medium 520 may include additional instructions. In other examples, the functionalities described herein in relation to instructions 522, 524, 526, 527, 528, 529, 530, 532, 534, 536, and any additional instructions described herein in relation to storage medium 520, may be implemented at least in part in electronic circuitry (e.g., via components comprising any combination of hardware and programming to implement the functionalities described herein). In some examples, device 500 may be a controller node for a storage platform or may be located within a controller node for a storage platform.

Processing resource 510 may fetch, decode, and execute instructions stored on storage medium 520 to perform the functionalities described above in relation to instructions 522, 524, 526, 527, 528, 529, 530, 532, 534, and 536. In other examples, the functionalities of any of the instructions of storage medium 520 may be implemented in the form of electronic circuitry, in the form of executable instructions encoded on a machine-readable storage medium, or a combination thereof. In the example of FIG. 5, storage medium 520 may be implemented by one machine-readable storage medium, or multiple machine-readable storage media.

Instructions 522 may receive a space management request 502 from a host 580 that identifies a virtual page address associated with a compressed page, as described above in relation to instructions 122 in FIG. 1. The compressed page may include compression metadata having a reference count that indicates a number of virtual pages of data in the compressed page. Host 580 may be a computer or other device running an operating system that allows a user access to the computer or device.

Instructions 524 may look up a virtual page table entry associated with the virtual page address in virtual page table 570, as described above in relation to instructions 124 of FIG. 1. The virtual page table entry of virtual page table 570 may identify the compressed page. Instructions 526 may mark the virtual page table entry as invalid without updating the reference count, as described above in relation to instructions 126 in FIG. 1. Instructions 527 may send an acknowledgment message to host 580 after marking the virtual page table entry as invalid, as described above in relation to instructions 227 of FIG. 2. In some examples, the sending of the acknowledgment message to host 580 may trigger certain instructions to be executed in the background as background tasks.

Instructions 528 may determine whether each virtual page table entry that identifies the compressed page is marked invalid, as described above in relation to instructions 128 of FIG. 1. In some examples, instructions 528 may further comprise instructions 340, 342, 344, 346, and 348 of FIG. 3. Based (at least in part) on the determination that each virtual page table entry that identifies the compressed page is marked invalid, instructions 530 may update the free space bitmap entry for the compressed page in the free space bitmap 560 to indicate the compressed page is free, as described above in relation to instructions 130 of FIG. 1. In some examples, updating the free space bitmap entry may involve setting or resetting the bit. For instance, setting the free space bitmap entry to "1" may indicate the compressed page is in-use whereas resetting the free space bitmap entry to "0" may indicate the compressed page is free. Based (at least in part) on the determination that each virtual page table entry associated with the compressed page is not invalid, instructions 532 may leave the free space bitmap entry for the compressed page unaltered, as described above in relation to instructions 232 of FIG. 2. Accordingly the free space bitmap entry will indicate that the compressed page is in-use. In some examples, instructions 528, 530, and 532 may further comprise instructions 529 to execute as background tasks, as described above in relation to instructions 229 of FIG. 2.

Instructions 534 may receive a request to access the compressed page, wherein the free space bitmap entry for the compressed page indicates that it is in-use, as described above in relation to instructions 234 of FIG. 2. In some examples, the request to access the compressed page may comprise a write operation, a read operation, a read-modify-write operation, or the like. Based (at least in part) on the request to access the compressed page, instructions 536 may selectively decrement the reference count stored in the compression metadata of the compressed page, as described above in relation instructions 236 of FIG. 2.

In some examples, instructions 522, 524, 526, 527, 528, 529, 530, 532, 534, and 536 may be part of an installation package that, when installed, may be executed by processing resource 510 of device 500 to implement the functionalities described above. In such examples, storage medium 520 may be a portable medium, such as a CD, DVD, or flash drive, or a memory maintained by a server from which the installation package can be downloaded and installed. In other examples, instructions 522, 524, 526, 527, 528, 529, 530, 532, 534, and 536 may be part of an application, applications, or component(s) already installed on device 500 including processing resource 510. In such examples, the storage medium 420 may include memory such as a hard drive, solid state drive, or the like. In some examples, functionalities described herein in relation to FIG. 5 may be provided in combination with functionalities described herein in relation to any of FIGS. 1-4 and 6-8.

Figure 6:
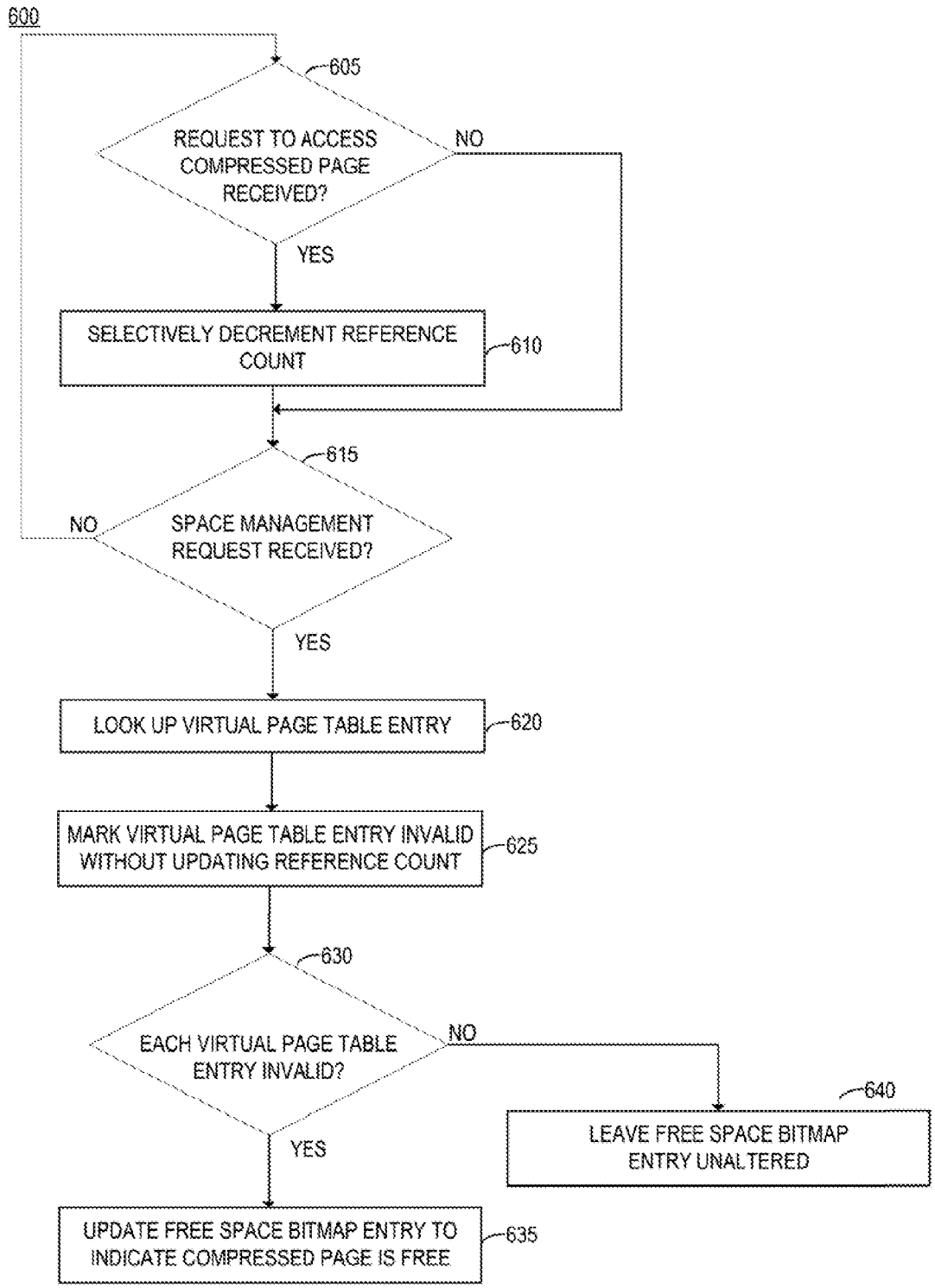
FIG. 6 is a flowchart of an example method for freeing memory space comprising determining if a request to access a compressed page has been received and if so, based on the request to access, decrementing a reference count, and determining if a space management request that identifies a virtual page address has been received, and if so, marking a virtual page table entry associated with the virtual page address as invalid without updating the reference count.

FIG. 6 is a flowchart of an example method 600 for memory space management including determining if a request to access a compressed page has been received and if so, based (at least in part) on the request to access, decrementing a reference count, and determining if a space management request that identifies a virtual page address has been received, and if so, marking a virtual page table entry associated with the virtual page address as invalid without updating the reference count. Although execution of method 600 is described below with reference to device 200 of FIG. 2, other suitable systems for the execution of method 600 can be utilized (e.g., device 500 of FIG. 5). Additionally, implementation of method 600 is not limited to such examples.

In the example of FIG. 6, method 600 may be a method of device 200. At 605 of method 600, it may be determined via a processing resource such as processing resource 210 of device 200, whether a request to access a compressed page has been received. A free space bitmap entry associated with the compressed page may indicate the compressed page is in-use and the compressed page may include a compression metadata having a reference count that indicates a number of virtual pates of data in the compressed page, as discussed above in relation to FIG. 2. In some examples, determining whether a request has been received may involve monitoring incoming requests, messages, and commands by processing resource 210. In some such examples, at 605, instructions 232 may receive a request to access the compressed page at device 200, as described above in relation to instructions 232 of FIG. 2. In some examples, based (at least in part) on the determination that a request to access the compressed page has not been received, method 600 may proceed to 615.

Based (at least in part) on the determination that a request to access a compressed page has been received, method 600 may proceed to 610. At 610, based (at least in part) on the request to access the compressed page, instructions 236 may selectively decrement the reference count stored in the compression metadata of the compressed page, as described above in relation to instructions 236 of FIG. 2. For example, a read-modify-write operation may involve decrementing of the reference count. A read operation, on the other hand, would not involve decrementing the reference count.

At 615 of method 600, it may be determined, via processing resource 210 of device 200, whether a space management request has been received. The space management request identifies a virtual address associated with the compressed page. In some examples, determining whether a request has been received may involve monitoring incoming requests, messages, and commands by processing resource 210. In some such examples, at 615, instructions 222 may receive a space management request 202 at device 200, as described above in relation to instructions 222 of FIG. 2. In some examples, based (at least in part) on the determination that a space management request has not been received, method 600 may proceed again to 605. In some such examples, 610 may iterate until a space management request has been received.

Based (at least in part) on the determination that the space management request has been received, at 620, instructions 224 may look up a virtual page table entry in the virtual page table that is associated with the virtual address in the virtual page table, as described above in relation to instructions 224 of FIG. 2. The virtual page table entry may identify the compressed page. In some examples, the virtual page table entry may identify the compressed page by its page address. At 625, instructions 226 may mark the virtual page table entry as invalid without updating the reference count, as described above in relation to instructions 226 of FIG. 2.

At 630, instructions 228 may determine, via processing resource 210, whether each virtual page table entry that identifies the compressed page is marked invalid, as described above in relation to instructions 228 of FIG. 2. In some examples, step 630 may be described in relation to method 730 of FIG. 7. Method 730 comprises steps 731, 732, 733, and 734. At step 731, instructions 340 may determine whether another virtual page table entry identifies the compressed page, as described above in relation to instructions 340 of FIG. 3. Based (at least in part) on the determination that there are no additional virtual page table entries that identify the compressed page, method 730 may proceed to 732. At 732, instructions 342 determine that each virtual page table entry that identifies the compressed page is marked invalid, as described above in relation to instructions 342 of FIG. 3. Based (at least in part) on the determination that another virtual page table entry identifies the compressed page, method 730 may proceed to 733. At 733, instructions 344 determine the state of the other virtual page table entry, as described above in relation to instructions 344 of FIG. 3.

Based (at least in part) on the determination that the other virtual page table entry is valid, method 730 may proceed to 734. At step 734, instructions 346 determine that each virtual page table entry that identifies the compressed page is not marked invalid, as described above in relation to instructions 346 of FIG. 3. Based (at least in part) on the determination that the other virtual page table entry is invalid, method 730 may proceed to 731 to determine whether another virtual page table entry identifies the compressed page, as described above in relation to instructions 348 of FIG. 3.

Returning to FIG. 6, based (at least in part) on the determination that each virtual page table entry is invalid, method 600 may proceed to 635. At 635, instructions 230 may update the free space bitmap entry for the compressed page to indicate that the compressed page is free, as described above in relation to instructions 230 of FIG. 2. Based (at least in part) on the determination that each virtual page table entry is not invalid, method 600 may proceed to 640. At 640, instructions 232 may leave the free space bitmap entry for the compressed page unaltered, as described above in relation to instructions 232 of FIG. 2.

Figure 7:
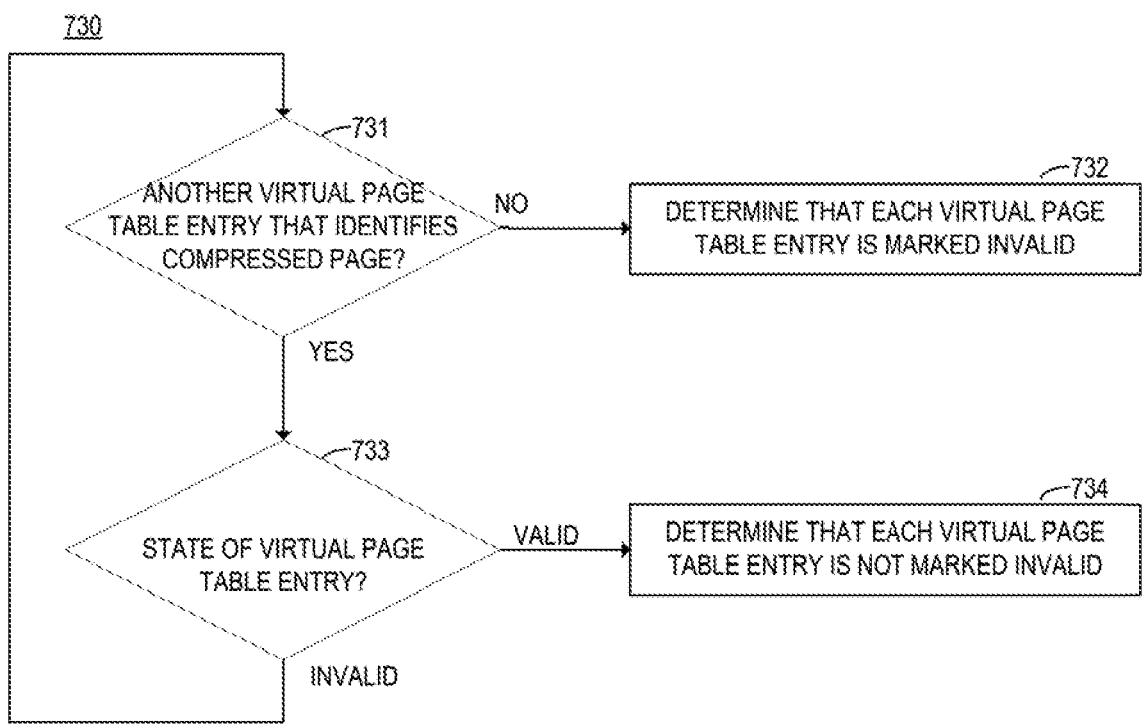
FIG. 7 a flowchart of an example method for determining whether each virtual page table entry is invalid.

Although the flowchart of FIG. 6 shows a specific order of performance of certain functionalities, method 600 is not limited to that order. Likewise, although the flowchart of FIG. 7 shows a specific order of performance of certain functionalities, method 700 is not limited to that order. For example, the functionalities shown in succession in the flowcharts may be performed in a different order, may be executed concurrently or with partial concurrence, or a combination thereof. In some examples, functionalities described herein in relation to FIGS. 6 and 7 may be provided in combination with functionalities described herein in relation to any of FIGS. 1-5 and 8.

What is claimed is:

1. An article comprising at least one non-transitory machine-readable storage medium comprising instructions executable by a processing resource of a device for memory space management to:
   receive, from a host, a space management request that identifies a virtual page address, wherein the virtual page address is associated with a compressed page that includes a compression metadata having a reference count that indicates a number of virtual pages of data in the compressed page;
   look up a virtual page table entry associated with the virtual page address in a virtual page table, wherein the virtual page table entry identifies the compressed page;
   mark the virtual page table entry as invalid without updating the reference count;
   determine whether each virtual page table entry that identifies the compressed page is marked invalid;
   based on the determination that each virtual page table entry that identifies the compressed page is invalid, update a free space bitmap entry for the compressed page to indicate the compressed page is free.

2. The article of claim 1, further comprising instructions executable by the processing resource of the device to:
   based on the determination that each virtual page table entry associated with the compressed page is not invalid, leave the free space bitmap entry for the compressed page unaltered.

3. The article of claim 2, wherein the instructions to determine whether each virtual page table entry that identifies the compressed page is marked invalid further comprise instructions to:
   determine whether another virtual page table entry identifies the compressed page;
   based on the determination that another virtual page table entry does not identify the compressed page, determine that each virtual page table entry that identifies the compressed page is marked invalid;
   based on the determination that another virtual page table entry identifies the compressed page, determine a state of the another virtual page table entry;
   based on the determination that the another virtual page table entry is valid, determine that each virtual page table entry that identifies the compressed page is not marked invalid; and
   based on the determination that the another virtual page table entry is invalid, return to the instructions to determine whether another virtual page table entry identifies the compressed page.

4. The article of claim 1, wherein the virtual page table is a multi-level virtual page table.

5. The article of claim 1, wherein the space management request is an unmap request or a write zero request.

6. The article of claim 1, further comprising instructions executable by the processing resource of the device to:
send an acknowledgment message to the host after marking the virtual page table entry as invalid.

7. The article of claim 1, wherein the instructions to determine whether each virtual page table entry that identifies the compressed page is marked invalid and the instructions to update the free space bitmap entry further comprise instructions to execute as a background task.

8. The article of claim 1, further comprising instructions executable by the processing resource of the device to:
receive a request to access the compressed page, wherein the free space bitmap entry indicates the compressed page is in-use; and
based on the request to access the compressed page, selectively decrement the reference count.

9. A device for memory space management comprising:
a processing resource;
a free space bitmap;
a virtual page table; and
a machine-readable storage medium encoded with instructions executable by the processing resource, the machine-readable storage medium comprising instructions to:
receive, from a host, a space management request that identifies a virtual page address, wherein the virtual page address is associated with a compressed page that includes a compression metadata having a reference count that indicates a number of virtual pages of data in the compressed page;
look up a virtual page table entry associated with the virtual page address in the virtual page table, wherein the virtual page table entry identifies the compressed page;
mark the virtual page table entry as invalid without updating the reference count;
determine whether each virtual page table entry that identifies the compressed page is marked invalid;
based on the determination that each virtual page table entry that identifies the compressed page is invalid, update a free space bitmap entry for the compressed page in a free space bitmap to indicate the compressed page is free; and
based on the determination that each virtual page table entry associated with the compressed page is not invalid, leave the free space bitmap entry in the free space bitmap unaltered.

10. The device of claim 9, wherein the machine-readable storage medium further comprises instructions executable by the processing resource to:
send an acknowledgment message to the host after marking the virtual page table entry as invalid.

11. The device of claim 10, wherein the instructions to determine whether each virtual page table entry that identifies the compressed page is marked invalid and the instructions to update the free space bitmap entry further comprise instructions to execute as a background task.

12. The device of claim 9, wherein the machine-readable storage medium further comprises instructions executable by the processing resource to:
receive a request to access the compressed page, wherein the free space bitmap entry indicates the compressed page is in-use; and
based on the request to access the compressed page, selectively decrement the reference count.

13. A method of memory space management comprising:
determining, via a processing resource, whether a request to access a compressed page has been received, wherein a free space bitmap entry associated with the compressed page indicates the compressed page is in-use, and wherein the compressed page includes a compression metadata having a reference count that indicates a number of virtual pages of data in the compressed page;
based on the determination that the request to access has been received and based on the request to access, selectively decrementing the reference count;
determining, via the processing resource, whether a space management request has been received, wherein the space management request identifies a virtual address associated with the compressed page;
based on the determination that the space management request has been received, looking up a virtual page table entry associated with the virtual address in the virtual page table, wherein the virtual page table entry identifies the compressed page;
marking the virtual page table entry as invalid without updating the reference count;
determining, via the processing resource, whether each virtual page table entry that identifies the compressed page is marked invalid;
based on the determination that each virtual page table entry that identifies the compressed page is invalid, updating a free space bitmap entry for the compressed page in the free space bitmap to indicate the compressed page is free; and
based on the determination that each virtual page table entry associated with the compressed page is not invalid, leaving the free space bitmap entry in the free space bitmap unaltered.

14. The method of claim 13 wherein determining whether each virtual page table entry that identifies the compressed page is marked invalid further comprises:
determining whether another virtual page table entry identifies the compressed page;
based on the determination that another virtual page table entry does not identify the compressed page, determining that each virtual page table entry that identifies the compressed page is marked invalid;
based on the determination that another virtual page table entry identifies the compressed page, determining a state of the another virtual page table entry;
based on the determination that the another virtual page table entry is valid, determining that each virtual page table entry that identifies the compressed page is not marked invalid; and
based on the determination that the another virtual page table entry is invalid, returning to the determining whether another virtual page table entry identifies the compressed page.

15. The method of claim 13 wherein the space management request is an unmap request or a write zero request.

* * * * *